(12) United States Patent
Nishiura (10) Patent No.: US 11,776,028 B2
(45) Date of Patent: *Oct. 3, 2023

(54) COMMERCIAL TRANSACTION SYSTEM, ADMINISTRATION SERVER, AND PROGRAM

(71) Applicant: BWB, Co., Ltd., Tokyo (JP)

(72) Inventor: Ryutaro Nishiura, Tokyo (JP)

(73) Assignee: BWB, CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,590

(22) Filed: Oct. 1, 2021

(65) Prior Publication Data

US 2022/0067806 A1    Mar. 3, 2022

Related U.S. Application Data

(63) Continuation of application No. 16/580,013, filed on Sep. 24, 2019, now Pat. No. 11,138,644, which is a
(Continued)

(30) Foreign Application Priority Data

May 23, 2016 (JP) ................................ 2016-102587

(51) Int. Cl.
G06Q 30/06 (2023.01)
G06Q 30/0601 (2023.01)
(Continued)

(52) U.S. Cl.
CPC ..... *G06Q 30/0607* (2013.01); *G06Q 10/0831* (2013.01); *G06Q 10/0832* (2013.01);
(Continued)

(58) Field of Classification Search
CPC ........... G06Q 30/0607; G06Q 30/0601; G06Q 10/0831; G06Q 10/0832
(Continued)

(56) References Cited

U.S. PATENT DOCUMENTS 7,596,500 B1 9/2009 Thompson et al.
7,711,612 B1 5/2010 Farias et al.
(Continued)

FOREIGN PATENT DOCUMENTS

CN 1293418 A 10/2000
EP 2667336 A1 11/2013
(Continued)

OTHER PUBLICATIONS

Milo, Melanie S; The ASEAN Economic Community and the Philippines: Implementation, Outcomes, Impacts, and Ways Forward. Publication info: Research Paper Series (Philippine Institute for Development Studies) 2: I,IX,1-74. Philippine Institute for Development Studies. (2013); retrieved from Dialog on Dec. 13, 2022.*

(Continued)

*Primary Examiner* — Yogesh C Garg
(74) *Attorney, Agent, or Firm* — DILWORTH IP, LLC (57) ABSTRACT

A commerce system includes an EC server connecting to a user terminal and executes E-commerce, a customs clearance authentication server that administers pre-customs clearance information, and an administration server connected to the customs clearance authentication server and the EC server. The administration server receives a registration request including product information regarding a product, transmits the registration request to the customs clearance authentication server, receives pre-customs clearance information regarding the product from the customs clearance authentication server, and notifies the pre-customs clearance information to the EC server. The customs clearance authentication server generates pre-customs clearance information based on product information, in response to a request from the EC server, and transmits generated pre-customs clearance information to the administration server.

(Continued)

The EC server transmits the received pre-customs clearance information along with product information to the user terminal, and accepts, from the user terminal, an instruction to circulate the product specified via customs.

9 Claims, 5 Drawing Sheets

Related U.S. Application Data continuation of application No. 15/511,729, filed as application No. PCT/JP2016/066352 on Jun. 2, 2016, now Pat. No. 10,460,366.

(51) Int. Cl.

| | | |
|---|---|---|
| G06Q 10/0831 | (2023.01) | |
| G06Q 50/26 | (2012.01) | |
| G06Q 10/0832 | (2023.01) | |

(52) U.S. Cl.
CPC ......... *G06Q 30/06* (2013.01); *G06Q 30/0601* (2013.01); *G06Q 30/0613* (2013.01); *G06Q 30/0635* (2013.01); *G06Q 50/26* (2013.01)

(58) Field of Classification Search
USPC ..................................................... 705/26.25
See application file for complete search history.

(56) References Cited

U.S. PATENT DOCUMENTS

| | | | |
|---|---|---|---|
| 2003/0023456 | A1 | 1/2003 | Dilollo et al. |
| 2003/0023522 | A1 | 1/2003 | Dutta et al. |
| 2003/0229615 | A1 | 12/2003 | Yamauchi et al. |
| 2004/0193471 | A1 | 9/2004 | Ozaki et al. |
| 2004/0204976 | A1 | 10/2004 | Oyama et al. |
| 2005/0068152 | A1 | 3/2005 | Umehara et al. |
| 2011/0218898 | A1* | 9/2011 | Chelniak ............... G06Q 30/04 705/34 |
| 2011/0313901 | A1 | 12/2011 | Kletzer |
| 2012/0109765 | A1 | 5/2012 | Araque |
| 2014/0279440 | A1 | 9/2014 | Felix |
| 2015/0073929 | A1 | 3/2015 | Psota et al. |
| 2015/0339760 | A1 | 11/2015 | Araque |
| 2017/0046656 | A1 | 2/2017 | Bramble et al. |
| 2017/0287147 | A1 | 10/2017 | Takahashi et al. |

FOREIGN PATENT DOCUMENTS

| | | | | |
|---|---|---|---|---|
| GB | 2362242 | A | | 11/2001 |
| JP | 2001-243366 | A | | 9/2001 |
| JP | 2001243366 | A | * | 9/2001 ............. G06Q 30/06 |
| JP | 2002-230335 | | | 8/2002 |
| JP | 2003-076777 | | | 3/2003 |
| JP | 2009-98914 | A | | 5/2009 |
| JP | 2013-235407 | | | 11/2013 |
| JP | 20158018 | A | | 1/2015 |
| KR | 2001-0111125 | | | 12/2001 |
| KR | 10-2002-0006868 | | | 1/2002 |
| KR | 20020017199 | A | | 3/2002 |
| KR | 100485330 | B1 | | 4/2005 |
| KR | 10-0946650 | | | 3/2010 |
| RU | 2376635 | C2 | | 12/2009 |
| RU | 2467501 | C2 | | 11/2012 |
| WO | 01/86377 | A2 | | 11/2001 |

OTHER PUBLICATIONS

Notice of Reasons for Refusal issued in Japanese Patent Application No. 2016-102587, dated Aug. 30, 2016.
International Search Report issued in PCT Application No. PCT/JP2016/066352, dated Dec. 15, 2016.
Notice of Reasons of Refusal issued in Korean Patent Application No. 10-2016-7036148, dated May 11, 2017.
Extended European Search Report issued in European Patent Application No. 16784371.3, dated Nov. 17, 2017.
Decision of Refusal issued in Korean Patent Application No. 10-2016-7036148, dated Oct. 10, 2017.
Decision of Refusal issued in Korean Patent Application No. 10-2016-7036148, dated Jan. 10, 2018.
Office Action issued in Taiwanese Patent Application No. 106116956, dated Dec. 27, 2017.
Office Action issued in Taiwanese Patent Application No. 106116956, dated Apr. 27, 2018.
Non-Final Office Action issued in U.S. Appl. No. 15/511,729, dated Jun. 4, 2018.
Notice of Reasons for Refusal issued in Korean Patent Application No. 10-2016-7036148, dated Jul. 30, 2018.
KATRI, "Confirmation of advanced clearance"; Korean Appeal Testing Institute; Copyright 2014.
First Notification of Office Action issued in Chinese Patent Application No. 201680001467.5, dated Jul. 26, 2018.
Decision of Rejection issued in Chinese Patent Application No. 201680001467.5, dated Jan. 11, 2019.
Office Action issued in Vietnamese Patent Application No. 1-2018-01179, dated May 7, 2019.
Search Report issued in Russian Patent Application No. 2018103919/08(005704), dated May 29, 2019.
Final Office Action issued in U.S. Appl. No. 15/511,729, dated Nov. 30, 2018.
Notice of Allowance issued in U.S. Appl. No. 15/511,729, dated Aug. 26, 2019.
Notification of Reexamination issued in Chinese Patent Application No. 201680001467.5, dated Mar. 18, 2020.
Examination Report issued in Indian Patent Application No. 201637029193, dated May 22, 2020.
Notification of Reason for Refusal issued in Korean Patent Application No. 10-2019-7003454, dated Oct. 30, 2020.
Non-Final Office Action issued in U.S. Appl. No. 16/580,013, dated Feb. 2, 2021.
Phuaphanthong, Thayanan; "A Memetic Theory of Interorganizational Information Systems (IOIS) Emergence and Evolution: A Longitudinal Case Study of IOIS for Trade Facilitation; A Dissertation Submitted to the Graduate Division of the University of Hawai'i at Manoa in Partial Fulfillment of the Requirements for the Degree of Doctor of Philosophy n Communication and Information Sciences"; May 2014.
Notice of Allowance issued in U.S. Appl. No. 16/580,013, dated Jul. 2, 2021.
First Notification of Office Action issued in Chinese Patent Application No. 201910885413.5, dated Jun. 2, 2021.
Notice of 3rd Office Action issued in Chinese Patent Application No. 201680001467.5, dated Jun. 18, 2021.
Notification of Reason for Refusal issued in corresponding Korean Patent Application No. 10-2021-7036568, dated Dec. 16, 2021.
Hearing Notice by CGPDTM issued in Indian Patent Application No. 201637029193 dated Mar. 27, 2023.
Applicant-Initiatied Interview Summary issued in U.S. Appl. No. 17/491,584 dated Apr. 7, 2023.
Request for the Submission of an Opinion issued in Korean Patent Application No. 10-2022-7034079, dated Nov. 27, 2022, 11 pages.
Non-Final Office Action issued in U.S. Appl. No. 17/491,584, dated Dec. 22, 2022; 38 pgs.
Milo, Melanie S., "The ASEAN Economic Community and the Philippines: Implementation, Outcomes, Impacts, and Ways Forward"; Philippine Institute for Development Studies; 2013; Retrieved from https://dialog.proquest.com/professional/docview/1548675032?accountid=131444.
Notice of Allowance issued in corresponding U.S. Appl. No. 17/491,584, dated Jun. 7, 2023.

* cited by examiner

| PRODUCT ID | PRODUCT NAME | PRICE | PRICE INC. TARIFF | PRE-CUSTOMS CLEARANCE | PRODUCT DETAILS |
|---|---|---|---|---|---|
| 01234 | REFRIGERATOR | ¥50000 | ¥52500 (A COUNTRY) | OK (A COUNTRY) | FUNCTIONS : ･ ･ ･ ･ ･ MANUFACTURER : ･ ･ ･ RELEASE DATE : ･ ･ ･ LATEST MODEL ! |
| 01235 | REFRIGERATOR | ¥45000 | ¥46800 (A COUNTRY) | OK (A COUNTRY) | FUNCTIONS : ･ ･ ･ ･ ･ MANUFACTURER : ･ ･ ･ RELEASE DATE : ･ ･ ･ GOING CHEAP ! |

ONLINE SHOPPING XYZ

<SEARCH RESULTS LIST>

B IS LOGGED IN.

PRODUCT SEARCH

FIG. 6

COMMERCIAL TRANSACTION SYSTEM, ADMINISTRATION SERVER, AND PROGRAM

CROSS REFERENCE TO RELATED APPLICATION

The present application claims the benefit of, and is a continuation application of U.S. non-provisional patent application Ser. No. 16/580,013, filed on Sep. 24, 2019, now U.S. Pat. No. 11,138,644 B2, issued on Oct.5, 2021, which is a continuation application of U.S. non-provisional patent application Ser. No. 15/511,729, filed on Mar. 16, 2017, now U.S. Pat. No. 10,460,366 B2, issued on Oct.29, 2019, which claims the benefit of International Application No. PCT/JP/2016/066352 filed on Jun. 2, 2016, which claims the benefit of Japanese Application No. 2016-102587 filed May 23, 2016, the contents of which are incorporated herein by reference in their entireties and the benefits of each are fully claimed herein.

TECHNICAL FIELD

The present invention relates to a system for realizing logistics across economic zones.

BACKGROUND ART

Recent years have seen an increase in interest in using an EC (E-commerce; Electronic Commercial Transaction) site to perform commercial transaction operations across different countries (so-called "International EC"). JP2013-235407A discloses a logistics information system for making customs work proceed smoothly while preventing falsification of private imports. In the same system, first, if a product purchase has been secured on an EC site in response to a request from a user, inspection of the product and calculation of tax rates is performed on an intermediary agent terminal. The result of the inspection and information regarding the tax rate is transmitted to a server, and billing information for payment of expenses to which user administration and tariffs have been added is generated in the server. The billing information is transmitted to a user terminal and the intermediary agent terminal. Upon confirming payment made by the user, an intermediary agent dispatches the product and pays for tariffs on behalf of the user.

TECHNICAL PROBLEM

In the system described in JP2013-235407A, customs clearance procedures are performed after a product is purchased, and thus, there are cases where it is determined that custom conditions have not been met ex post facto after the product has arrived at customs, for example. In this case, there is an increase in work on the customs side and this becomes a cause of delays in logistics. That is to say, in the technique described in JP2013-235407A, despite the expectation that the burden on the user regarding customs clearance work will be mitigated, there is room for improvement in terms of making customs clearance processing smoother.

SUMMARY

An object of the present invention is to make customs clearance processing smoother.

The present invention, in one aspect, includes an EC server that connects to a user terminal and executes E-commerce; a customs clearance authentication server that administers pre-customs clearance information; and an administration server that is connected to the customs clearance authentication server and the EC server, wherein the administration server includes: a means for generating a registration request that includes product information regarding a product; a means for transmitting the registration request to the customs clearance authentication server; a means for receiving pre-customs clearance information regarding the product from the customs clearance authentication server; and a means for notifying the pre-customs clearance information to the EC server, the customs clearance authentication server includes: a means for generating pre-customs clearance information based on the product information, in response to a request from the EC server; and a means for transmitting the generated pre-customs clearance information to the administration server, and the EC server includes: a means for transmitting the received pre-customs clearance information along with the product information to the user terminal; and a means for accepting, from the user terminal, an instruction to circulate a product specified by the product information via customs.

The present invention, in another aspect, is an administration server that includes: an accepting means for receiving a registration request that includes product information regarding a product; a requesting means for transmitting the registration request to a customs clearance authentication apparatus; an acquiring means for acquiring pre-customs clearance information regarding the product, from the customs clearance authentication apparatus; and a notification means for notifying the pre-customs clearance information to a commercial transaction apparatus that connects to a user terminal and executes E-commerce.

According to the present invention, it is possible to make customs clearance processing smoother.

DETAILED DESCRIPTION

Figure 1:
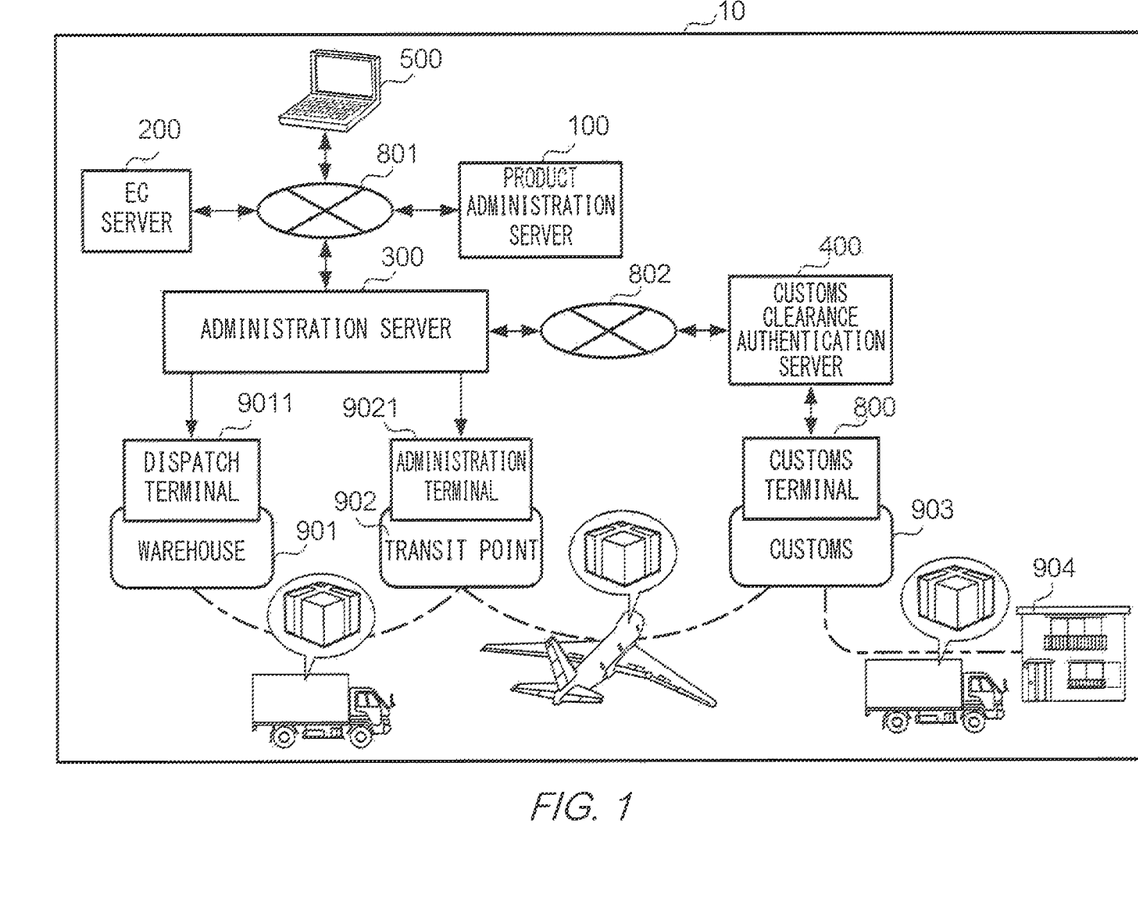
FIG. 1 is a diagram showing an overview of commercial transaction system 10.

As shown in FIG. 1, commercial transaction system 10 includes product administration server 100, EC server 200, administration server 300, customs clearance authentication server 400, and user terminal 500. Administration server 300 connects to customs clearance authentication server 400 via second network 802, whereas administration server 300 connects to EC server 200 and product administration server 100 via first network 801. First network 801 and second network 802 may be the same communication network or different communication networks. For example, first network 801 may be the Internet and second network 802 may be a VPN (Virtual Private Network).

Commercial transaction system 10 is a system for circulating products between two economic zones (an economic zone being a country or other region that requires customs clearance processing when products come in from another zone). Specifically, commercial transaction system 10 is for a user (purchaser of product: hereinafter simply "user") operating user terminal 500 to purchase a product through using a site that is built by EC server 200 and run by a corporation established in X country (e.g., Japan) and delivering the product from warehouse 901 (e.g., owned by a delivery company) in X country to delivery address 904 in A country (e.g., China). At this time, the product will pass through customs 903 that is in A country. Note that when the product is exported from X country, the product passes through customs in X country, but this has been omitted from the diagrams. Also, the residence of the user may be in X country, A country or another country, and does not have to be the same as the delivery address.

Also, even though only one EC server 200 is depicted in FIG. 1, there may be a plurality of EC servers 200. Similarly, the place from which the products handled by commercial transaction system 10 are dispatched (warehouse 901) may exist at a plurality of locations in a plurality of countries. In this case, administration server 300 performs administration regarding the logistics of products traded on all EC servers 200.

Transit point 902 is administered by a delivery company affiliated with administration server 300 and is set up at a predetermined place in the X country. Administration server 300 is connected to transit point 902, and is provided with administration terminal 9021 that is operated by a worker, and administration of goods that have arrived at transit point 902 is performed using administration terminal 9021. In the case where the delivery addresses for all of the products purchased via a website on EC server 200 are in A country, the products are initially delivered from warehouse 901 to transit point 902 under the direction of administration server 300.

Customs 903 is administered by customs of A country or a corresponding authority in A country that administers the import of articles, and customs 903 administers articles coming in to A country. Specifically, customs 903 examines whether or not articles are compatible with the criteria of A country, and imposes predetermined tariffs as necessary.

User terminal 500 connects to EC server 200 and executes E-commerce. Hereinafter, E-commerce includes purchasing products (tangible products), payment processing, and delivery of purchased products. User terminal 500 is an information processing apparatus such as a personal computer, a smartphone or a mobile phone that accesses EC server 200 and displays a web site built by EC server 200, and has a function of transmitting an instruction to purchase or deliver a product to EC server 200 based on an instruction input by the user.

Product administration server 100 is, for example, owned by a product manufacturer or a product wholesaler, and is an apparatus that holds information regarding products listed as products for sale on a website built by EC server 200. Specifically, product administration server 100 stores information that identifies a product (an ID attached to each article), a product name, a product category ("electrical appliance", "washing machine", and the like), place of origin, composition, product function, features, other detailed information about a product, and images taken of a product (hereinafter collectively referred to as "product information"). Note that all or a part of the product information may be acquired or generated by administration server 300. In this case, product administration server 100 may be omitted from commercial transaction system 10.

Figure 2:
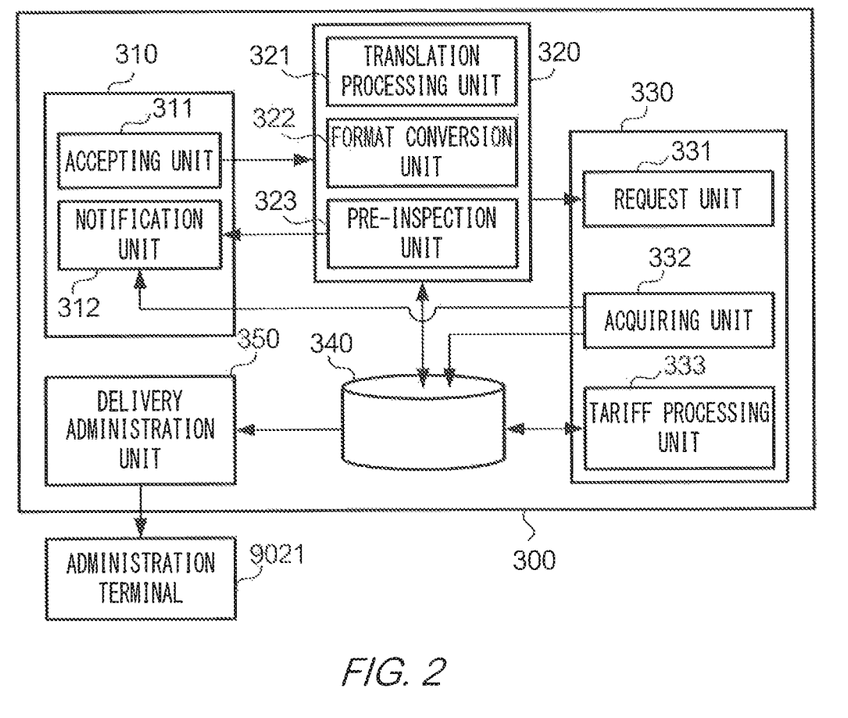
FIG. 2 is a diagram showing a functional configuration of administration server 300.

FIG. 2 is a diagram showing a functional configuration of administration server 300. Administration server 300 is an information processing apparatus that supports registration processing (hereinafter "pre-customs clearance processing") regarding customs clearance to be performed at customs 903 in relation to products handled by EC server 200. Specifically, administration server 300 includes first communication unit 310, data processing unit 320, second communication unit 330, storage unit 340, and delivery administration unit 350. First communication unit 310 is implemented as a communication interface for transmitting and receiving information between product administration server 100 and EC server 200. Second communication unit 330 is implemented as a communication interface for transmitting and receiving information with customs clearance authentication server 400.

First communication unit 310 includes accepting unit 311 and notification unit 312. Accepting unit 311 receives a registration request including product information from product administration server 100. Notification unit 312 notifies pre-customs clearance information acquired from customs clearance authentication server 400 to EC server 200. The pre-customs clearance information may include at least information indicating that pre-registration processing has been performed on customs clearance authentication server 400, and may include a result of customs clearance processing (compliant/non-compliant), tariff rates and a monetary amount to be applied to a product, information for calculating the tariff (information indicating a classification determined for each article (HS code), and the like), and other information related to customs clearance processing.

Additionally, accepting unit 311 acquires order information from EC server 200 every time a commercial transaction (product sales/purchase contract) is established between EC server 200 and user terminal 500. The order information includes, out of product information regarding the transaction target, at least a product ID, an ID identifying the purchaser (a number that can uniquely specify an individual, for example, My Number, a passport number, and the like), the delivery address, and information indicating transaction content other than the identification ID of EC server 200.

Data processing unit 320 is implemented as a processor and includes translation processing unit 321, format conversion unit 322, and pre-inspection unit 323, and generates data required to request customs clearance authentication server 400 to perform pre-customs clearance, based on a request from administration server 300.

Pre-inspection unit 323 determines whether or not product information acquired from product administration server 100 satisfies criteria required by customs 903. For example, in the case where customs 903 requests information regarding predetermined characteristics about a product that has been permitted to circulate within the country of origin, pre-inspection unit 323 performs confirmation as to whether or not information items regarding such characteristics exist in the product information received from product administration server 100. In the case where it is determined that the criteria have not been satisfied, format conversion unit 322 requests product administration server 100 to provide additional product information via notification unit 312. Note that pre-inspection unit 323 may, in addition to determining a lack of information items, determine whether or not the content of the information (for example, product size, weight, characteristics, applications, properties, etc.) satisfies the requests of customs 903, and may, in the case where the requests are not satisfied, provide notification that the product is noncompliant (in other words, that the product is a banned product) at customs 903 to product administration server 100, via notification unit 312.

Also, the functions of at least one of format conversion unit 322 and pre-inspection unit 323 may be realized by an apparatus (not shown) that is connected to administration server 300.

In the case where pre-inspection unit 323 has determined that the criteria have been satisfied, translation processing unit 321 translates, when necessary, product information listed in the official language of X country into the official language of A country. Specifically, translation processing unit 321 performs machine translation processing in accordance with a predetermined translation algorithm while referring to dictionary data stored in storage unit 340. Alternatively, translation processing unit 321 may be provided separate from administration server 300, and a request for translation of product information may be made to a dedicated translation server (not shown) via a connected network, and the translation result acquired.

Format conversion unit 322 edits the translated portion of product information obtained by translation processing unit 321 into an information format required by customs clearance authentication server 400. For example, format conversion unit 322 deletes information items that are not necessary, converts the information item name, and integrates items.

Second communication unit 330 includes request unit 331, acquiring unit 332, and tariff processing unit 333. Request unit 331 transmits a pre-customs clearance request to customs clearance authentication server 400. Additionally, request unit 331 transmits the order information received from EC server 200 to customs clearance authentication server 400. Acquiring unit 332 acquires, from customs clearance authentication sever 400, pre-customs clearance information regarding a product received from product administration server 100. In response to a request from customs clearance authentication server 400, tariff processing unit 333 sequentially or collectively performs payment processing for tariffs with respect to products processed at customs 903.

Storage unit 340 is a storage apparatus such as a hard disk or a semi-conductor memory, and stores a program for realizing the above described functions on administration server 300 when it is executed by an OS, or a processor. Pre-customs clearance information received from customs clearance authentication server 400 is stored in association with the corresponding product information.

Delivery administration unit 350 is implemented as a processor, and extracts the required information from the order information acquired from EC server 200, transmits the extracted information to administration terminal 9021, and requests delivery processing. Specifically, at least the product ID and information regarding the sender (information including the purchaser's name and home address, and information regarding the delivery address (recipient's name and home address) is transmitted, and in a preferable mode, the purchaser ID and the EC website ID are additionally extracted. Of these pieces of information, at least the product ID moves with the product by being packaged with the product, being attached to a packaging member of the product, or the like.

Figure 3:
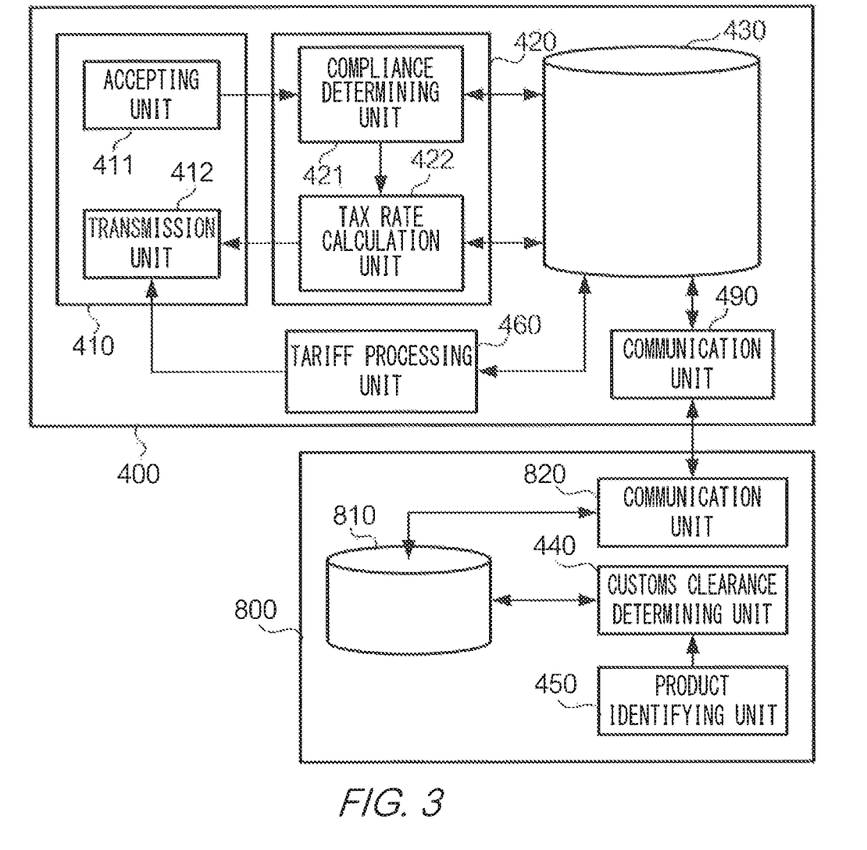
FIG. 3 is a diagram showing a functional configuration of customs clearance authentication server 400 and customs terminal 800.

FIG. 3 is a diagram showing a functional configuration of customs clearance authentication server 400 and customs terminal 800. Customs clearance authentication server 400 includes communication unit 410, request processing unit 420, database 430, communication unit 490, and tariff processing unit 460, and generates pre-customs clearance information in response to a request from administration server 300. Customs clearance authentication server 400 also checks products that have arrived at customs, in response to a request from customs 903.

Communication unit 410 includes receiving unit 411 and transmission unit 412, and is implemented as a communication interface for transmitting and receiving information between administration servers 300. Additionally, communication unit 410 acquires order information from an administration server.

Receiving unit 411 receives a pre-customs clearance request included in information generated by data processing unit 320. Transmission unit 412 transmits pre-customs clearance information generated by request processing unit 420 to administration server 300. Also, transmission unit 412 transmits a tariff payment request supplied from tariff processing unit 460 to administration server 300.

Request processing unit 420 includes compliance determining unit 421 and tax rate calculation unit 422, and is implemented as a processor. In response to a request from administration server 300, compliance determining unit 421 generates pre-customs clearance information based on product information included in the request. Specifically, compliance determining unit 421 accesses customs terminal 800 and transmits product information thereto, inquires as to whether or not the product has been cleared by customs 903, and stores the result of the inquiry in database 430. In the case of the product being compliant, tax rate calculation unit 422 refers to the information stored in database 430 to determine the tariff information (tariff and amount, or information required to decide a tariff (information regarding product classification such as a HS code)) regarding the product, with reference to the database stored in database 430. Then, information indicating that the product was compliant with pre-customs clearance and the determined tariff are included in the pre-customs clearance information. Additionally, information such as the day of verification may be included in the pre-customs clearance information, for example. Note that in the case where it has been determined that a product is not compliant with customs clearance, information indicating noncompliance included in the pre-customs clearance information.

Database 430 is a storage apparatus such as a hard disk or semi-conductor memory, and stores a program for operating the customs clearance authentication server 400, as well as information required to determine compliance with customs clearance and information required to calculate the tariff (for example, a correspondence table of tax amounts and classifications). Additionally, pre-customs clearance information generated by request processing unit 420 is stored in database 430.

Communication unit 490 connects to customs terminal 800 and acquires, when necessary, information required to determine compliance of an import, and information required to calculate the tariff, from customs terminal 800.

Customs terminal 800 is a computer run by customs authorities, and customs staff process products that have arrived at customs 903, based on information stored in this computer. Specifically, product identifying unit 450 specifies products that have arrived at customs 903. The product identifying unit 450 is implemented as an apparatus that reads a barcode expressing a product ID that has been stuck to the packaging of products, for example. Communication unit 820 transmits and receives information to and from the customs clearance authentication server 400.

Customs clearance determining unit 440 refers to database 810 to determine whether or not pre-customs clearance processing has been performed on a product. Specifically, customs clearance determining unit 440 performs confirmation as to whether matching pre-customs clearance information that includes a product ID that matches that of the product that has arrived exists, and if such information does exist, customs clearance determining unit 440 extracts order information that corresponds to the product ID, and checks whether the ID is one that is already registered in EC server 200. Additionally, customs clearance determining unit 440 checks the purchaser ID. For example, in the case where there are restrictions on the same purchaser bringing products into A country in the regulations of customs 903, confirmation is performed as to whether or not these restrictions apply. When all of the above-described checks have been cleared, information indicating that customs clearance processing has been completed is stored, and the product is sorted by customs staff or an automatic conveying device (not shown) provided at customs 903 and is carried outside of customs and delivered to a predetermined delivery address by a predetermined delivery company. If the pre-customs clearance processing has not been performed, normal processing (inspection, tariff classification and tariff amount calculation, call-out notification to delivery address, and the like) is performed.

Tariff processing unit 460 refers to database 430 and makes a request to administration server 300, via communication unit 412, that tariffs be paid for all products for which there is information indicating that the product has been checked at customs 903. This request is collectively made for a plurality of products, for example.

Figure 4:
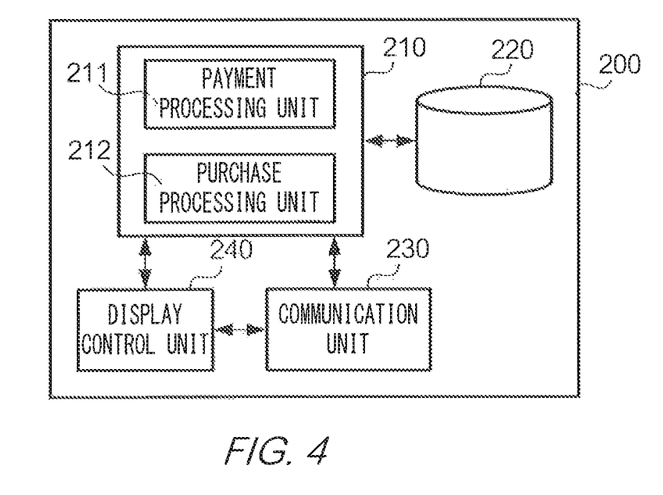
FIG. 4 is a diagram showing a functional configuration of EC server 200.

FIG. 4 is a diagram showing a functional configuration of EC server 200. EC server 200 is administered by an operator that runs an EC (E-commerce) site. EC server 200 includes transaction execution unit 210, storage unit 220, communication unit 230, storage unit 220, and display control unit 240.

Storage unit 220 is a storage apparatus such as a hard disk or a semi-conductor memory, and stores a program for causing EC server 200 to realize the following function when it is executed by an OS or a processor. Apart from the program for realizing the functions of EC server 200, storage unit 220 stores user information acquired from user terminal 500 (login ID, password, user identification ID, home address, name, etc., credit card payment information such as a credit card number, and other information acquired in advance from the user in order to use the EC site), information regarding the inventory of listed products, product information, pre-customs clearance information received from administration server 300, and order information generated by EC server 200 when a commercial transaction is established.

Display control unit 240 creates content to be displayed on a site based on product information and pre-customs clearance information acquired from administration server 300.

Communication unit 230 is implemented as a communication interface for transmitting and receiving information to and from administration server 300, user terminal 500, warehouse 901, and a credit administration server (not shown). Communication unit 230 receives product information and pre-customs clearance information from administration server 300. Also, communication unit 230 provides content generated by display control unit 240 to user terminal 500 in response to a request made by the user. Furthermore, communication unit 230 accepts an instruction from user terminal 500 to circulate a product specified by product information via customs 903. Specifically, when a product purchase and a delivery request to a delivery address designated by the user is accepted from user terminal 500, this request is supplied to transaction execution unit 210. Also, communication unit 230 transmits order information generated by purchase processing unit 212 to administration server 300.

Transaction execution unit 210 is implemented as a processor and processes information regarding commercial transactions. Transaction execution unit 210 includes payment processing unit 211 and purchase processing unit 212. Payment processing unit 211 refers to storage unit 220 and performs payment processing in relation to the purchase of a product. Specifically, payment processing unit 211 connects to an un-shown payment server by using information stored in storage unit 220, and withdraws the payment amount (product expenses, delivery expenses, commission for payment using EC server 200 and administration server 300, tariffs, and the like) of the product from a bank account of the user.

Purchase processing unit 212 generates order information for each transaction (for each purchased product) based on information acquired from user terminal 500 and storage unit 220.

Figure 5:
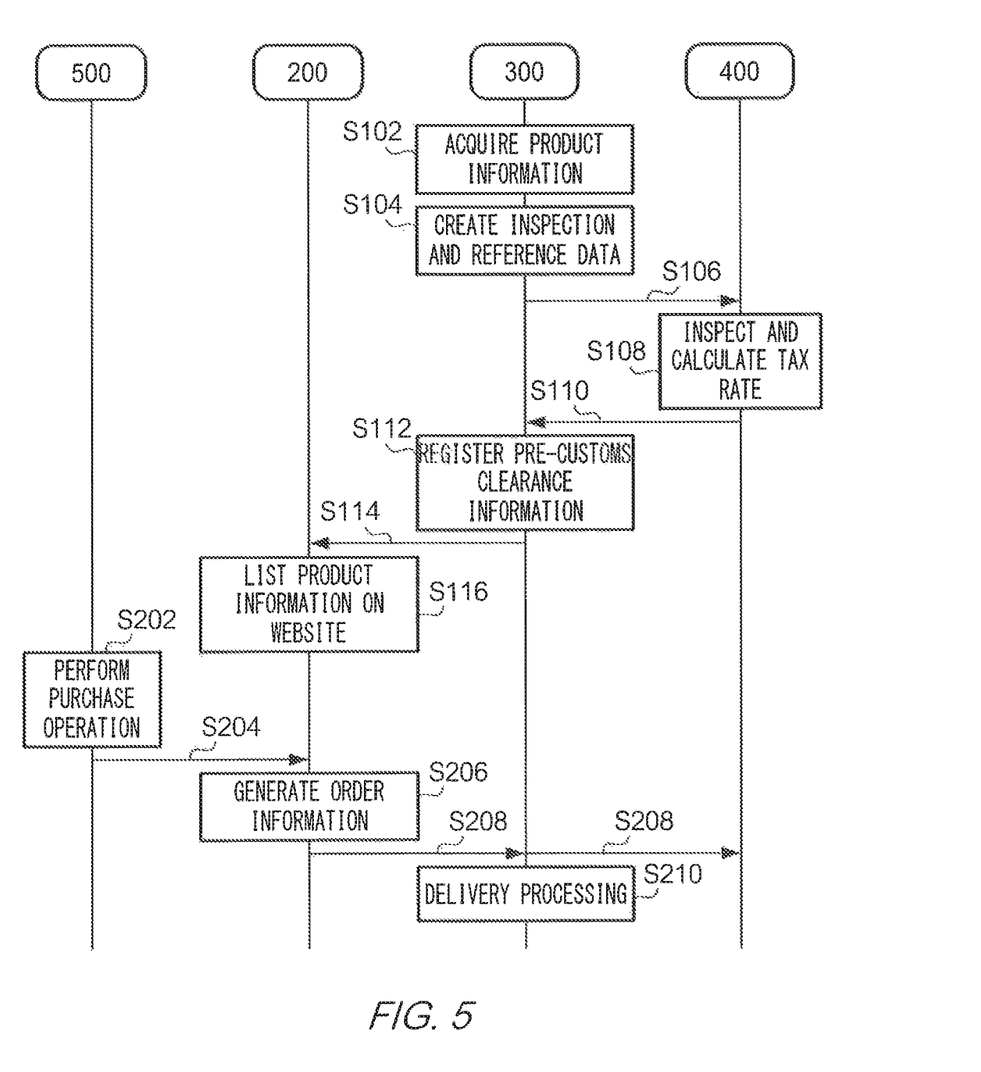
FIG. 5 is a diagram showing exemplary operations of commercial transaction system 10.

FIG. 5 is a diagram showing exemplary operations of the commercial transaction system 10. First, each EC server 200 that constitutes the commercial transaction system 10 respectively transmits a corresponding EC server 200 ID to customs terminal 800 via administration sever 300 and customs clearance authentication server 400, and thus each EC server 200 is registered in advance in customs terminal 800. Also, it is assumed that the user has performed member registration in advance on the EC site.

Product administration server 100 transmits product information regarding a product that is to be listed on EC server 200 to administration server 300 (S102). Administration server 300 checks product information (pre-inspection), performs translation processing and format conversion on the product information if necessary, and generates data for customs clearance authentication server 400 to reference (S104). The generated data is transmitted to customs clearance authentication server 400 included in a pre-customs clearance request (S106). When the pre-customs clearance request is received, customs clearance authentication server 400 accesses customs terminal 800 when necessary, performs compliance with customs clearance and calculation of the tariff, and generates pre-customs clearance information (S108). The generated pre-customs clearance information is stored in database 430 and is also transmitted to administration server 300 from customs clearance authentication server 400 (S110). When the pre-customs clearance information is received from customs clearance authentication server 400, administration server 300 stores the pre-customs clearance information in storage unit 340 (S112), and transfers the pre-customs clearance information to EC server 200 (S114). Thus the pre-customs clearance processing is completed.

Figure 6:
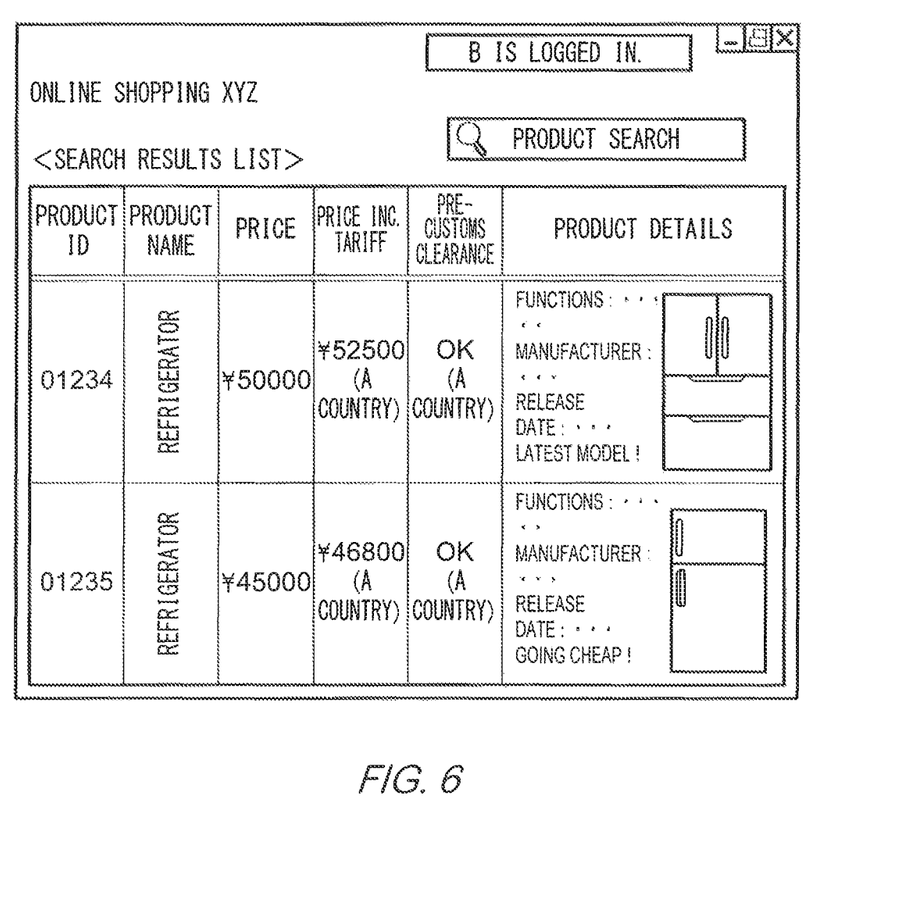
FIG. 6 is a diagram showing an example of a screen displayed on user terminal 500.

EC server 200 generates content regarding a product based on acquired product information (S116). An example of this content being displayed on user terminal 500 is shown in FIG. 6. In this example, a product ID, a product name, a price, and detailed information on the product are extracted from the product information acquired from administration server 300, and information indicating the tariff rate and whether or not pre-customs clearance has been performed, which is acquired from administration server 300, is displayed. In FIG. 6, it is shown that the product specified by "01235" has undergone pre-customs clearance processing in A country, and that a 5% tariff was added at purchase. On the other hand, it is shown that the product specified by "01234" has undergone pre-customs clearance processing in A country, and that a 4% tariff was added at purchase.

Note that in the case where country A employs a taxation system in which the tariff amount (or rate) depends on the country of the purchaser or warehouse 901, EC server 200 may, for instance, acquire information regarding the country where user terminal 500 was located at the time of login, and display tariff information added in accordance with the above-described taxation system.

Returning to FIG. 5, when a user who has accessed EC server 200 from user terminal 500 and confirmed a screen such as shown in FIG. 6, decides to purchase a product, he or she performs predetermined operations such as designating the product to be purchased and inputting necessary information such as a delivery address (S202). The input information is transmitted to EC server 200 (S204). EC server 200 generates order information based on the input information (S206). The order information is transmitted to administration server 300 and registered in customs terminal 800 (S208). Administration server 300 transmits information required for dispatch, based on the order information, to dispatch terminal 9011 (S210). Thereafter, the product is delivered by a predetermined delivery company in X country from warehouse 901 to transit point 902, the product is checked by administration terminal 9021 and customs terminal 800, and finally the product is delivered to delivery address 904.

According to the embodiment described above, the purchaser or receiver of the product, and the like is spared the time and effort of going to customs and carrying out custom procedures. Thus, customs clearance processing is performed smoothly with no delays of logistics at customs. Also, when a product is purchased, it is virtually guaranteed to pass through customs, and thus the user feels a sense of relief knowing that the product will definitely arrive. Furthermore, the user can comprehend the tariff rate in advance when purchasing a product, and thus can think about the product to be purchased while giving consideration to the tariff.

Commercial transaction system 10 is intended to support dispatch to a plurality of countries, and may include a plurality of customs 903 and a plurality of respectively corresponding customs clearance authentication servers 400. In other words, one customs clearance authentication server 400 is provided in each country (or each customs authority), and generates pre-customs clearance information for each customs authority. In this case, content created by EC server 200 includes information that indicates at which customs pre-customs clearance has been completed, among a plurality of customs 903. The product information may be provided to EC server 200 separately from pre-customs clearance information. For example, the product information can be transmitted directly to EC server 200 from product administration server 100.

Also, the present invention is applicable in any form that involves a commercial transaction in which an article is circulated via a customs authority, and the form of the transaction including the type of product for transaction and the transfer of money is not limited to the examples described above. Note that it is sufficient that the customs is an organization that monitors the movement of articles across two different economic zones. The functions of administration server 300 may be split and implemented by two or more apparatuses. That is to say, the administration server of the present embodiment includes an accepting means for receiving a registration request including product information regarding a product, a requesting means for transmitting the registration request to a customs clearance authentication apparatus; an acquiring means for acquiring pre-customs clearance information regarding the product from the customs clearance authentication apparatus; and a notification means for notifying the pre-customs clearance information to an E-commerce apparatus that connects to a user terminal and executes E-commerce.

REFERENCE SIGNS LIST

100 . . . Product administration server, 200 . . . EC Server, 300 . . . Administration server, 400 . . . Customs clearance authentication server, 500 . . . User terminal, 801 . . . First network, 802 . . . Second network, 901 . . . Warehouse, 902 . . . Transit point, 903 . . . Customs, 904 . . . Delivery address, 310 . . . First communication unit, 311 . . . Accepting unit, 312 . . . Notification unit, 320 . . . Data processing unit, 330 . . . Second communication unit, 331 . . . Request unit, 332 . . . Acquiring unit, 350 . . . Delivery administration unit, 340 . . . Storage unit, 333 . . . Tariff processing unit, 430 . . . Database, 420 . . . Request processing unit, 410 . . . Communication unit, 411 . . . Receiving unit, 412 . . . Transmission unit, 421 . . . Compliance determining unit, 422 . . . Tax rate calculation, 460 . . . Tariff processing unit, 440 . . . Customs clearance determining unit, 450 . . . Product identifying unit, 210 . . . Transaction execution unit, 220 . . . Storage unit, 211 . . . Payment processing unit, 212 . . . Purchase processing unit, 240 . . . Display control unit, 321 . . . Translation processing unit, 322 . . . Format conversion unit, 323 . . . Pre-inspection unit, 230 . . . Communication unit, 9011 . . . Dispatch terminal, 9021 . . . Administration terminal, 800 . . . Customs terminal.

What is claimed is:

1. An administration server employed in a commerce system that includes: an EC server that executes E-commerce between a first economic zone and a second economic zone for at least one product of the first economic zone via an EC site accessible by at least one user terminal; and a customs clearance authentication server communicating with a customs terminal in a second economic zone and administers pre-customs clearance information, the administration server comprising a processor to:
receive a request for registration of the at least one product of the first economic zone before the EC server posts product information of the at least one product on the EC site accessible by the at least one user terminal, the request including product information which includes a product ID of the at least one product;
transmit a request for pre-customs clearance to the customs clearance authentication server to determine whether the at least one product corresponding to the product information is compliant with customs clearance;
request pre-customs clearance, which is pre-registration for customs clearance, and includes generating and storing pre-customs information, the pre-customs information including a result representative that the at least one product is compliant with the customs clearance and the product ID of the at least one product;

receive pre-customs clearance information for the at least one product from the customs clearance authentication server, wherein the pre-customs clearance information includes information indicating that the pre-customs clearance has been performed for the at least one product by the customs clearance authentication server;

store the pre-customs clearance information received from the customs clearance authentication server in association with the product information; and notify the EC server to post on the EC site product information for the at least one product for which pre-customs clearance has been performed, the product information including the product ID;

wherein the customs clearance authentication server is configured to:

perform pre-customs clearance, which is pre-registration for customs clearance and includes generating and storing pre-customs information, in response to the request for the pre-customs clearance made by the administration server, the pre-customs information including a result that the at least one product is compliant with the customs clearance and the product ID of the at least one product; and transmit the pre-customs clearance information representative that the pre-customs clearance has been performed for the at least one product by the customs authentication server to the administration server;

wherein the EC server is configured to:

transmit product information of the at least one product for which pre-customs clearance has been performed to the at least one user terminal when the at least one user terminal accesses the EC site or in response to a request from the at least one user terminal for searching for the at least one product in on the EC site; and accept, from the at least one user terminal, an instruction to purchase the at least one product corresponding to the product information which is transmitted to the at least one user terminal; and generate order information, which includes the product ID of the at least one product, in response to the instruction to purchase the at least one product from the at least one user terminal; and wherein the customs terminal is configured to:

check for existence of the pre-customs clearance information which includes the product ID of the at least one product when the at least product corresponding to the order information arrives at the customs of the second economic zone; and store information indicating completion of custom clearance processing in the second economic zone for the at least one product at least in a case that it is confirmed that pre-customs clearance has been performed for the at least one product by checking that the pre-customs clearance information which includes the stored product ID of the at least one product exists.

2. The administration server according to claim 1, wherein:

the request of pre-customs clearance includes product information of the at least one product; and the product information is edited into a format required by the customs clearance authentication server and the edited product information is transmitted to the customs clearance authentication server.

3. The administration server according to claim 2, wherein the editing includes processing to translate a language in which the product information is described.

4. The administration server according to claim 1, wherein the processor is further configured to:

determine whether the product information satisfies a criteria required by the customs clearance authentication server; and request, in a case where the criteria is not satisfied, additional information from a transmission source of the registration request.

5. The administration server according to claim 1, wherein:

the pre-customs clearance information is generated for each country, and the EC server determines a country in which the user terminal is located and notifies the pre-customs clearance information of the determined country to the user terminal.

6. The administration server according to claim 1, wherein the second economic zone is a plurality of different economic zones; and wherein the customs includes a plurality of customs wherein each customs is located in a respective different economic zone of the plurality of different economic zones.

7. The administration server according to claim 6, wherein the first economic zone is a first country; and wherein each of the plurality of different economic zones is a respective different country.

8. The administration server according to claim 1, wherein the first economic zone is a first country; and wherein the second economic zone is a second country.

9. A plurality of non-transitory computer-readable mediums comprising respective instructions embodied thereon, the respective instructions, when executed by respective computers employed in a commerce system that includes: an EC server that executes E-commerce between a first economic zone and a second economic zone for at least one product of the first economic zone via an EC site accessible by at least one user terminal; a customs clearance authentication server communicating with a customs terminal in a second economic zone and administers pre-customs clearance information; and an administration serverthat is in communication with the customs clearance authentication server and the EC server, causing the respective computer of an administration server to:

receive a request for performing pre-customs clearance, the request including a product ID of the at least one product before the EC server posts product information of the at least one product on the EC site which is accessible by the at least one user terminal;

transmit a request for the pre-customs clearance to the customs clearance authentication server to determine whether the at least one product indicated by the product information is compliant with customs clearance;

request performing of pre-customs clearance which is a pre-registration of a customs clearance and includes generating and storing pre-customs information, the pre-customs information including a result representative that the product is compliant with the customs clearance and the product ID of the at least one product;

receive pre-customs clearance information for the at least one product from the customs clearance authentication server, wherein the pre-customs clearance information includes information indicating that the pre-customs clearance has been performed for the at least one product by the customs clearance authentication server; and notify the EC server to post on the EC site product information of the at least one product for which pre-customs clearance has been performed;

causing the respective computer of the customs clearance authentication server to:

perform pre-customs clearance, which is pre-registration for customs clearance and includes generating and storing pre-customs information, in response to the request for the pre-customs clearance made by the administration server, the pre-customs information including a result that the at least one product is compliant with the customs clearance and the product ID of the at least one product: and transmit the pre-customs clearance information representative that the pre-customs clearance has been performed for the at least one product by the customs authentication server to the administration server, causing the respective computer of the EC server to:

transmit product information of the at least one product for which pre-customs clearance has been performed to the at least one user terminal when the at least one user terminal accesses the EC site or in response to a request from the at least one user terminal for searching for the at least one product in on the EC site; and accept, from the at least one user terminal, an instruction to purchase the at least one product corresponding to the product information which is transmitted to the at least one user terminal; and generate order information, which includes the product ID of the at least one product, in response to the instruction to purchase the at least one product from the at least one user terminal; and causing the respective computer of a customs terminal to:

check for existence of the pre-customs clearance information which includes the product ID of the at least one product when the at least product corresponding to the order information arrives at the customs of the second economic zone; and store information indicating completion of custom clearance processing in the second economic zone for the at least one product at least in a case that it is confirmed that pre-customs clearance has been performed for the at least one product by checking that the pre-customs clearance information which includes the stored product ID of the at least one product exists.

* * * * *